United States Patent
Xu et al.

(10) Patent No.: US 9,924,205 B2
(45) Date of Patent: Mar. 20, 2018

(54) VIDEO REMOTE-COMMENTARY SYNCHRONIZATION METHOD AND SYSTEM, AND TERMINAL DEVICE

(71) Applicant: Tencent Technology (Shenzhen) Company Limited, Shenzhen, Guangdong (CN)

(72) Inventors: Xiaomin Xu, Guangdong (CN); Junming Li, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/316,327

(22) PCT Filed: Jun. 10, 2015

(86) PCT No.: PCT/CN2015/081192
§ 371 (c)(1),
(2) Date: Dec. 5, 2016

(87) PCT Pub. No.: WO2015/188755
PCT Pub. Date: Dec. 17, 2015

(65) Prior Publication Data
US 2017/0142451 A1    May 18, 2017

(30) Foreign Application Priority Data
Jun. 10, 2014   (CN) .......................... 2014 1 0255532

(51) Int. Cl.
*H04N 21/231*   (2011.01)
*H04N 21/235*   (2011.01)
(Continued)

(52) U.S. Cl.
CPC ....... *H04N 21/2187* (2013.01); *H04N 21/233* (2013.01); *H04N 21/4307* (2013.01); *H04N 21/8106* (2013.01); *H04N 21/8455* (2013.01)

(58) Field of Classification Search
CPC ......... H04N 21/23109; H04N 21/2353; H04N 21/4307
(Continued)

(56) References Cited

U.S. PATENT DOCUMENTS 8,244,105 B2   8/2012  Verna
8,744,237 B2   6/2014  Baldwin et al.
(Continued)

FOREIGN PATENT DOCUMENTS

CN         1273002 A      11/2000
CN       102325173 A       1/2012
(Continued)

OTHER PUBLICATIONS

International Search Report and Written Opinion of the ISA for PCT/CN2015/081192, ISA/CN, Haidian District, Beijing, dated Sep. 9, 2015.
(Continued)

*Primary Examiner* — Dominic D Saltarelli
(74) *Attorney, Agent, or Firm* — Harness, Dickey & Pierce, P.L.C.

(57) ABSTRACT

To-be-commented video data is received by a terminal device, and a video sequence number of the to-be-commented video data is determined, which steps further include comprising, by the video data, a first correlation 2-tuple of a global base sequence number and the video sequence number, in which a sequence number of a live voice in the video data is the global base sequence number, and the video sequence number of the video data is determined according to the global base sequence number; and determining a
(Continued)

video sequence number of the to-be-commented video data according to the first correlation 2-tuple. The to-be-commented video data is played, a commentary voice is acquired, and a correspondence between a voice sequence number of the commentary voice and the video sequence number is determined. The correspondence between the voice sequence number and the video sequence number is sent to a video playback end.

7 Claims, 4 Drawing Sheets

(51) Int. Cl.
    *H04N 21/43*     (2011.01)
    *H04N 21/2187*     (2011.01)
    *H04N 21/81*     (2011.01)
    *H04N 21/233*     (2011.01)
    *H04N 21/845*     (2011.01)

(58) Field of Classification Search
    USPC ........................................................ 725/136
    See application file for complete search history.

(56) References Cited

U.S. PATENT DOCUMENTS

| | | | |
|---|---|---|---|
| 9,055,271 | B2 | 6/2015 | Verna et al. |
| 9,392,211 | B2 | 7/2016 | Baldwin et al. |
| 2002/0122112 | A1 | 9/2002 | Mallart et al. |
| 2008/0028023 | A1* | 1/2008 | Locke ................ H04L 65/4015 709/203 |
| 2009/0170603 | A1 | 7/2009 | Chittoor et al. |
| 2009/0238541 | A1 | 9/2009 | Verna |
| 2012/0210348 | A1 | 8/2012 | Verna et al. |
| 2012/0321271 | A1 | 12/2012 | Baldwin et al. |
| 2012/0328062 | A1 | 12/2012 | Kang |
| 2013/0335629 | A1 | 12/2013 | Laurent et al. |
| 2014/0255002 | A1 | 9/2014 | Baldwin et al. |

FOREIGN PATENT DOCUMENTS

| | | |
|---|---|---|
| CN | 102427507 A | 4/2012 |
| CN | 103621106 A | 3/2014 |
| CN | 104135667 A | 11/2014 |
| JP | 02-022991 A | 1/1990 |
| JP | 09-219851 A | 8/1997 |
| JP | 10-210409 A | 8/1998 |
| JP | 11-144378 A | 5/1999 |
| JP | 2008-288935 A | 11/2008 |
| JP | 2010232716 A | 10/2010 |
| JP | 2011-23811 A | 2/2011 |
| JP | 2013-514034 A | 4/2013 |
| JP | 2013545355 A | 12/2013 |
| KR | 1020120007763 | 8/2013 |
| WO | 2005/098854 A1 | 10/2005 |

OTHER PUBLICATIONS

Chinese Office Action for Application No. 201410255532.X dated Feb. 28, 2015, and an English concise explanation of relevance thereof.
Korean Office Action for Application No. 10-2016-7036174 dated Jan. 11, 2018, and an English translation thereof.
Japanese Office Action for Application No. 2016-572554 dated Jan. 23, 2018, and an English translation thereof.

* cited by examiner

VIDEO REMOTE-COMMENTARY SYNCHRONIZATION METHOD AND SYSTEM, AND TERMINAL DEVICE

FIELD OF THE TECHNOLOGY

The present disclosure relates to the field of communications technologies, and in particular, to a video remote-commentary synchronization method and system, and a terminal device.

BACKGROUND OF THE DISCLOSURE

In fields such as sports and entertainment, there are scenarios in which a commentator gives a commentary. For example, during a football match, there is a live transmission commentary as well as a recording commentary.

A commentator is a person specializing in explaining, introducing, and analyzing a sport/an event, and is mostly employed in TV/broadcast multimedia. At present, with the development of e-sports games, a person who is engaged in giving a commentary on e-sports is also referred to as a commentator.

The sports commentator not only leads us from an unknown world to a palace of a commented object, but also leads us to being enthusiastic about the commented object. The commentary widely exists in our life.

A video having a commentary includes the following work parts: 1. acquiring a live video; 2. acquiring a commentary voice; 3. synthesizing the video and the voice.

An implementation solution of a current video commentary is as follows: Commentators are gathered together to give a commentary on a video when they are watching the video, and this case generally occurs in a recording commentary; or a commentator watches and gives a commentary on a video at a scene of acquiring the video, and acquiring of the video and acquiring of a commentary voice are performed simultaneously, and this case generally occurs in a live commentary, for example, live transmission of a football match.

According to the above solutions, it is required to gather commentators, resulting in that a remote commentary on a same video by multiple commentators cannot be implemented.

SUMMARY

Embodiments of the present invention provide a video remote-commentary synchronization method and system, and a terminal device, so as to implement a remote commentary on a same video by multiple commentators.

A video remote-commentary synchronization method includes:

receiving to-be-commented video data, and determining a video sequence number of the to-be-commented video data;

playing the to-be-commented video data, acquiring a commentary voice, and determining a correspondence between a voice sequence number of the commentary voice and the video sequence number; and sending to a video playback end the correspondence between the voice sequence number and the video sequence number, so that the video playback end plays the commentary voice according to the correspondence between the voice sequence number and the video sequence number while playing a video.

A video remote-commentary synchronization method includes:

acquiring a live video as to-be-commented video data;

extracting a live voice from the video data, using a sequence number of the live voice as a global base sequence number, and determining a video sequence number of the video data according to the global base sequence number; and generating a first correlation 2-tuple including the global base sequence number and the video sequence number, and sending to a video commentary end video data including the first correlation 2-tuple.

A video remote-commentary synchronization method includes:

receiving video data and a commentary voice that corresponds to the video data, the video data having a video sequence number and the commentary voice having a voice sequence number;

receiving a correspondence between the voice sequence number and the video sequence number; and playing the commentary voice according to the correspondence between the voice sequence number and the video sequence number when the video data is played.

A terminal device includes:

a video receiving unit, configured to receive to-be-commented video data;

a video playback unit, configured to play the video data received by the video receiving unit;

a voice acquiring unit, configured to acquire a commentary voice;

a sequence number determining unit, configured to determine a video sequence number of the to-be-commented video data received by the video receiving unit; and determine a correspondence between a voice sequence number of the commentary voice acquired by the voice acquiring unit and the video sequence number; and a sequence number sending unit, configured to send to a video playback end the correspondence between the voice sequence number and the video sequence number, so that the video playback end plays the commentary voice according to the correspondence between the voice sequence number and the video sequence number while playing a video.

A terminal device includes:

a video acquiring unit, configured to acquire a live video as to-be-commented video data;

a sequence number determining unit, configured to extract a live voice from the video data, use a sequence number of the live voice as a global base sequence number, and determine a video sequence number of the video data according to the global base sequence number;

a 2-tuple generating unit, configured to generate a first correlation 2-tuple including the global base sequence number and the video sequence number; and a 2-tuple sending unit, configured to send to a video commentary end video data including the first correlation 2-tuple.

A terminal device includes:

a data receiving unit, configured to receive video data and a commentary voice that corresponds to the video data, the video data having a video sequence number and the commentary voice having a voice sequence number; and receive a correspondence between the voice sequence number and the video sequence number; and a playback unit, configured to play the commentary voice according to the correspondence between the voice sequence number and the video sequence number when the video data is played.

A video remote-commentary synchronization system includes:

a video acquiring terminal, a commentary terminal, and a playback terminal that are connected in a communicable manner, the video acquiring terminal being any one of terminal devices for acquiring a video provided by embodiments of the present invention, the commentary terminal being any one of terminal devices of a commentary end provided by embodiments of the present invention, and the playback terminal being any one of terminal devices of a video playback end provided by embodiments of the present invention.

It can be seen from the above technical solutions that, embodiments of the present invention have the following advantages: because the video commentary end performs operations related to the video sequence number and the voice sequence number, so that the video playback end receives the correspondence between the voice sequence number and the video sequence number. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the present disclosure is further described in detail below with reference to the accompanying drawings. Apparently, the described embodiments are merely some rather than all embodiments of the present invention. All other embodiments obtained by a person of ordinary skill in the art based on the embodiments of the present invention without creative efforts shall fall within the protection scope of the present disclosure.

Figure 1:
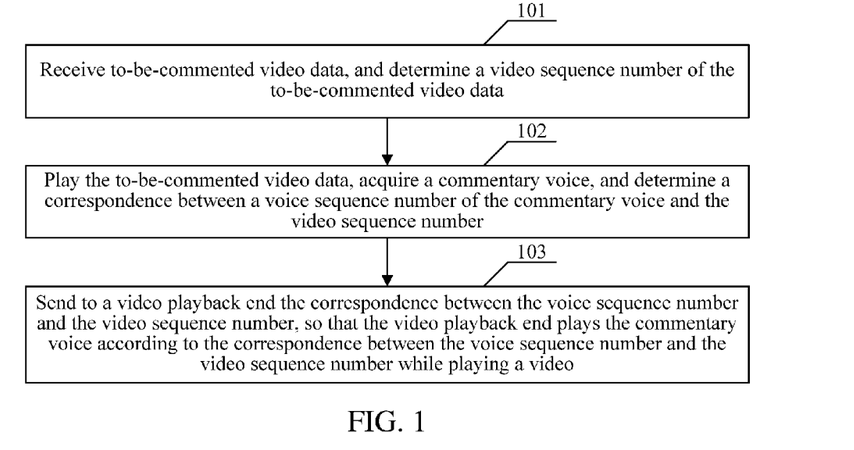
FIG. 1 is a schematic flowchart of a method according to an embodiment of the present invention.

An embodiment of the present invention provides a video remote-commentary synchronization method as shown in FIG. 1, including:

101: Receive to-be-commented video data, and determine a video sequence number of the to-be-commented video data.

The video sequence number is a sequence number for representing a video slice. An order of video slices may be determined according to the video sequence number, for example, a video frame. A frame number of the video frame may be used as the video sequence number.

102: Play the to-be-commented video data, acquire a commentary voice, and determine a correspondence between a voice sequence number of the commentary voice and the video sequence number.

Because this embodiment is implemented in a commentary end, it is required to play the video data for a commentator. The commentator may comment on the watched video image, thereby forming a commentary voice. The commentary voice is acquired by a commentary terminal of the commentary end. The voice sequence number is a sequence number for representing a voice slice. An order of voice slices may be determined according to the voice sequence number, for example, a voice frame. A frame number of the voice frame may be used as the voice sequence number.

103: Send to a video playback end the correspondence between the voice sequence number and the video sequence number, so that the video playback end plays the commentary voice according to the correspondence between the voice sequence number and the video sequence number while playing a video.

In this embodiment of the present invention, because a video commentary end performs operations related to the video sequence number and the voice sequence number, so that the video playback end receives the correspondence between the voice sequence number and the video sequence number. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

This embodiment of the present invention further provides descriptions of an optional solution of a determining solution of a video sequence number by using an example, as follows: The receiving to-be-commented video data, and determining a video sequence number of the to-be-commented video data includes:

including, by the video data, a first correlation 2-tuple of a global base sequence number and the video sequence number, where a sequence number of a live voice in the video data is the global base sequence number, and the video sequence number of the video data is determined according to the global base sequence number; and determining a video sequence number of the to-be-commented video data according to the first correlation 2-tuple.

In this embodiment of the present invention, the sequence number as a base is a sequence number obtained by segmenting a live voice, a sequence number obtained by segmenting video data may also be used as the basic sequence number, or a sequence number may be newly added as a base, which is not limited by this embodiment of the present invention.

This embodiment of the present invention further provides descriptions of optional solutions of a determining solution of a voice sequence number and an expression form of a correspondence by using an example, as follows: The determining a correspondence between a voice sequence number of the commentary voice and the video sequence number includes:

determining a voice sequence number of a commentary voice according to the global base sequence number in the first correlation 2-tuple; and generating a second correlation 2-tuple including the global base sequence number and the voice sequence number.

Based on implementation solutions of the above embodiment, this embodiment of the present invention further provides a solution on sending a correspondence between the voice sequence number and the video sequence number, as follows: The sending to a video playback end the correspondence between the voice sequence number and the video sequence number includes:

sending the first correlation 2-tuple and the second correlation 2-tuple to a video playback end.

In this embodiment of the present invention, the first correlation 2-tuple and the second correlation 2-tuple may be combined into a triplet, which may include a global base sequence number, a video sequence number, and a voice sequence number. Therefore, the first correlation 2-tuple may include a global base sequence number, a video sequence number, and an unassignment sequence; and a newly-determined voice sequence number in the second correlation 2-tuple may be filled in the unassignment sequence in the triplet. Therefore, implementation of this embodiment of the present invention is not limited by the above embodiment. Any implementation solution that can be used to determine a correspondence between the voice sequence number and the video sequence number does not affect implementation of this embodiment of the present invention.

Figure 2:
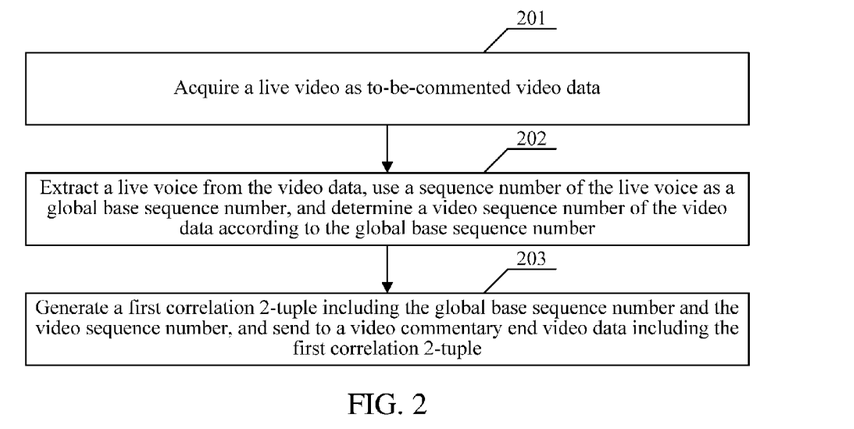
FIG. 2 is a schematic flowchart of a method according to an embodiment of the present invention.

An embodiment of the present invention further provides another video remote-commentary synchronization method as shown in FIG. 2, including:

201: Acquire a live video as to-be-commented video data.

202: Extract a live voice from the video data, use a sequence number of the live voice as a global base sequence number, and determine a video sequence number of the video data according to the global base sequence number.

203: Generate a first correlation 2-tuple including the global base sequence number and the video sequence number, and send to a video commentary end video data including the first correlation 2-tuple.

Based on descriptions of the above embodiment, in this embodiment of the present invention, the global base sequence number in the first correlation 2-tuple is used for generating the second correlation 2-tuple. However, the first correlation 2-tuple and the second correlation 2-tuple may be combined into a triplet, which may include a global base sequence number, a video sequence number, and a voice sequence number. Therefore, the first correlation 2-tuple, actually, may include a global base sequence number, a video sequence number, and an unassignment sequence; and a newly-determined voice sequence number in the second correlation 2-tuple may be filled in the unassignment sequence in the triplet. Therefore, if the solution is used, there is one unassignment sequence in a triplet. Actually, it may be thought that this triplet is equivalent to a 2-tuple. The difference between them lies in that a commentary end assigns a value to an unassignment sequence, or a sequence is newly added for assignment. Therefore, implementation of this embodiment of the present invention is not limited by the above embodiment. Any implementation solution that can be used to determine a correspondence between the sequence number of the live voice and the video sequence number does not affect implementation of this embodiment of the present invention.

This embodiment of the present invention is implemented by using the video acquiring end. By using correlation 2-tuples, an order of the video data and a playback order and a correspondence of a video and a voice are identified, so that it is convenient for the video commentary end to mark an order of a commentary voice and a correspondence between the commentary voice and the video according to the orders. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

This embodiment of the present invention further provides a solution on obtaining a global base sequence number, which is specifically as follows: The using a sequence number of the live voice as a global base sequence number includes: segmenting the extracted a live voice into a data slice, so as obtain a sequence number of the live voice as a global base sequence number.

In this embodiment of the present invention, the sequence number as a base is a sequence number obtained by segmenting a live voice, a sequence number obtained by segmenting video data may also be used as the basic sequence number, or a sequence number may be newly added as a base, which is not limited by this embodiment of the present invention.

Figure 3:
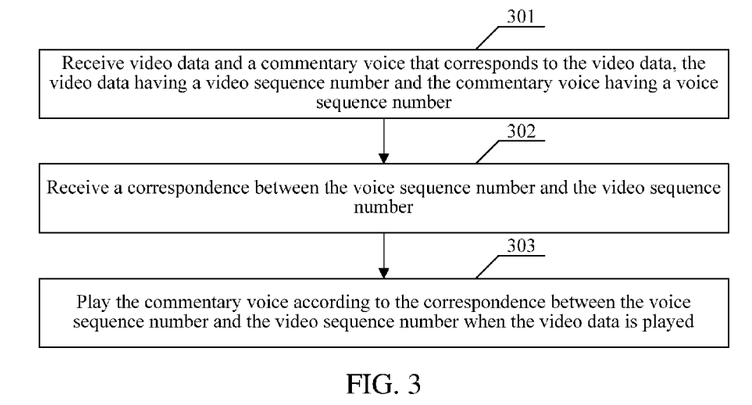
FIG. 3 is a schematic flowchart of a method according to an embodiment of the present invention.

An embodiment of the present invention further provides another video remote-commentary synchronization method as shown in FIG. 3, including:

301: Receive video data and a commentary voice that corresponds to the video data, the video data having a video sequence number and the commentary voice having a voice sequence number.

In this embodiment of the present invention, the video data may be from a commentary terminal of a commentary end, and may also be from a video acquiring end in which the video data is forwarded via a server, which is not limited by this embodiment of the present invention.

302: Receive a correspondence between the voice sequence number and the video sequence number.

In this embodiment of the present invention, the correspondence between the voice sequence number and the video sequence number may be directly sent to a video playback device of a video playback end by the commentary terminal of the commentary end, and may also be forwarded and uniformly sent by the server, which is not limited by this embodiment of the present invention.

303: Play the commentary voice according to the correspondence between the voice sequence number and the video sequence number when the video data is played.

In this embodiment of the present invention, because the video playback end receives the correspondence between the voice sequence number and the video sequence number, regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

This embodiment of the present invention further provides a processing solution when there are multiple commentary voices, which is specifically as follows: If there are two or more a commentary voice sources, the method further includes:

selecting or switching the currently played a commentary voice according to a preset rule.

When there are multiple commentary voices, how to predefine a selection and switching rule may be set by a technical person freely, for example, a priority of each commentary end is set in advance, and a voice is selected to be played currently according to the priority. A specific rule is not limited by this embodiment of the present invention.

This embodiment of the present invention further provides a specific determining solution to a correspondence between the voice sequence number and the video sequence number, as follows: The receiving a correspondence between the voice sequence number and the video sequence number includes:

receiving a first correlation 2-tuple and a second correlation 2-tuple, where the first correlation 2-tuple includes a global base sequence number and the video sequence number and the second correlation 2-tuple includes the global base sequence number and the voice sequence number, where a sequence number of a live voice in the video data is the global base sequence number, the video sequence number of the video data is determined according to the global base sequence number, and the voice sequence number is determined according to the global base sequence number.

In this embodiment of the present invention, the sequence number as a base is a sequence number obtained by segmenting a live voice, a sequence number obtained by segmenting video data may also be used as the basic sequence number, or a sequence number may be newly added as a base, which is not limited by this embodiment of the present invention.

In this embodiment of the present invention, the first correlation 2-tuple and the second correlation 2-tuple may be combined into a triplet, which may include a global base sequence number, a video sequence number, and a voice sequence number. Therefore, the first correlation 2-tuple may include a global base sequence number, a video sequence number, and an unassignment sequence; and a newly-determined voice sequence number in the second correlation 2-tuple may be filled in the unassignment sequence in the triplet. Therefore, implementation of this embodiment of the present invention is not limited by the above embodiment. Any implementation solution that can be used to determine a correspondence between the voice sequence number and the video sequence number does not affect implementation of this embodiment of the present invention.

Based on the implementation solution in which two correlation 2-tuples are used, this embodiment of the present invention further provides a specific voice playback process, which is implemented as follows: The playing the commentary voice according to the correspondence between the voice sequence number and the video sequence number when the video data is played includes:

acquiring a sequence number of a current video image when the video data is played, acquiring a global base sequence number corresponding to the sequence number of the current video image according to the first correlation 2-tuple, and acquiring a voice sequence number corresponding to the acquired global base sequence number according to the second correlation 2-tuple;

determining a live voice corresponding to the acquired global base sequence number and determining a commentary voice corresponding to the acquired voice sequence number; and playing the determined a live voice and the determined a commentary voice when the current video image is played.

The following embodiment is described by using an example in which multiple commentators comment simultaneously, and two 2-tuples are used to carry related synchronization information.

This embodiment of the present invention provides a solution on synchronizing multiple remote commentaries during video live transmission, so as to implement that a user can hear commentaries given by multiple persons simultaneously and remotely when watching live transmission, and simplify synchronization and switching of remote and multiple commentaries, thereby providing amazing watching experience for an audience.

Implementation of this embodiment of the present invention are mainly divided into three stages:

The first stage: a base sequence number is generated according to live transmission, which specifically includes the following steps:

1. A video acquiring device acquires a live voice and video data in real time.

2. A live voice stream is segmented into a data slice and a global base sequence number is generated.

3. A video sequence number of a live video stream is generated according to the BaseSequence, where a generation rule may be a correlation 2-tuple sequence as follows:

<VideoSequence.idx, BaseSequence.idx> . . . ;

4. The voice and the video that carry a BaseSequence and a VideoSequence, and a correlation relationship are uploaded to a background server live, and then, pushed to all users, including common audiences and remote commentaries.

The second stage: generation of a voice sequence number of a remote commentary specifically includes the following steps:

1. A remote commentator sees a video image and gives a synchronous commentary on the video image; and a commentary terminal acquires a voice.

2. On a side of the commentary terminal, a voice sequence number of a commentary voice and a video sequence number of a video are also be generated by relying on the BaseSequence, where the generation rule may be a correlation 2-tuple sequence as follows:

<CommentVoiceSequence.idx, BaseSequence.idx> . . .
<CommentVideoSequence.idx, BaseSequence.idx> . . . ;

3. The commentary terminal uploads the CommentVoiceSequence, the CommentVideoSequence, and correlation 2-tuples of the BaseSequence to the background server, and then, the CommentVoiceSequence, the CommentVideoSequence, and correlation 2-tuples of the BaseSequence are pushed to all users by the background server.

Figure 4:
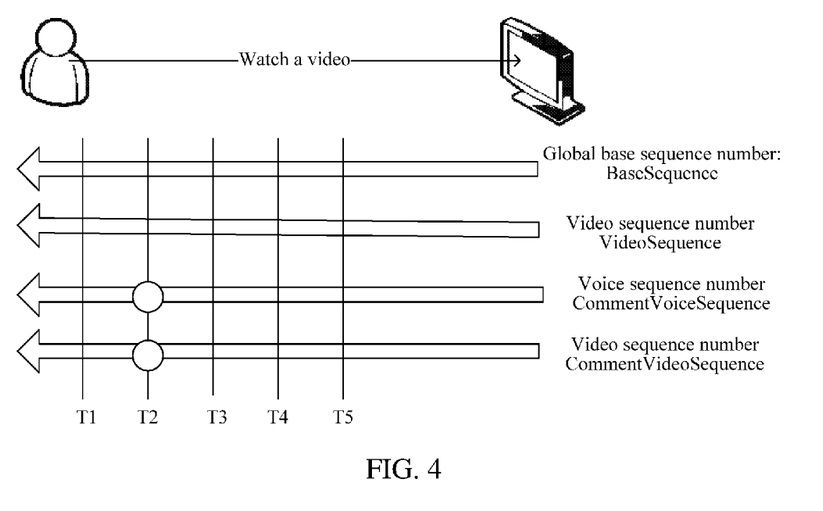
FIG. 4 is a schematic diagram of video playback synchronization according to an embodiment of the present invention.

The third stage: a commentary synchronization strategy for a user to watch a live transmission video specifically includes the following steps:

1. Referring to FIG. 4, when the user watches the video, playback is pushed stably according to a set buffer duration and a timeline of the BaseSequence, as T1, T2, T3, T4, and T5 shown in FIG. 4.

In FIG. 4, there are four arrows to the left from top to bottom. The former two are data related to an acquired live video, which are divided into a global base sequence number (a sequence number of a live voice) and a video sequence number (a sequence number of a live video); and the latter two are video data of the commentary end, which includes a voice sequence number (a sequence number of a commentary voice) and a video sequence number (a video sequence number corresponding to the commentary voice).

2. Playback depends on a relationship of a projected 2-tuple.

<CommentVoiceSequence.idx, BaseSequence.idx> . . .
<CommentVideoSequence.idx, BaseSequence.idx> . . . ;

If at a point of the BaseSequence.idx, for example, on a time point T2 in the above figure, it is detected that there are a commentary voice and a commentary video by following a correlation relationship, the commentary is played.

3. There are multiple commentaries, and the processing rules are consistent.

4. Multiple commentaries are switched, for example, a commentary A is switched to a commentary B, which is also processed according to the rule; and if there is no a switching concept, a commentary playback stream A is stopped, a commentary playback stream B is received, and when the commentary playback stream B matches the BaseSequence.idx, the commentary B starts to be played.

According to the above implementation manner, a synchronization problem of a multiple-place commentary in a live transmission video is simplified. Moreover, by using a normalized processing manner, there is no correlation relationship between each anchor switch, so that service fluency and code simplicity are ensured, and at the same time, second-time buffer and pause do not occur during playback of a video.

Figure 5:
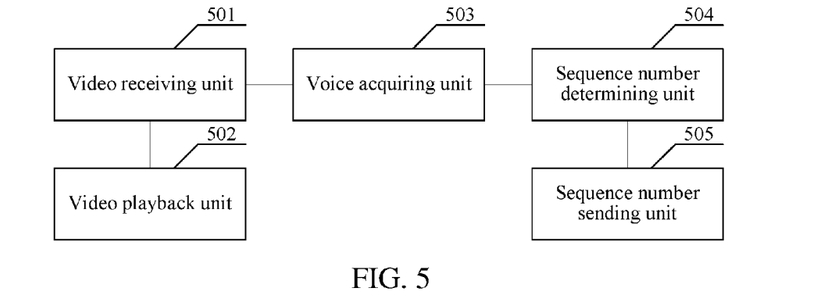
FIG. 5 is a schematic structural diagram of a terminal device according to an embodiment of the present invention.

An embodiment of the present invention further provides a terminal device as shown in FIG. 5, including:

a video receiving unit 501, configured to receive to-be-commented video data;

a video playback unit 502, configured to play the video data received by the video receiving unit 501;

a voice acquiring unit 503, configured to acquire a commentary voice;

a sequence number determining unit 504, configured to determine a video sequence number of the to-be-commented video data received by the video receiving unit 501; and determine a correspondence between a voice sequence number of the commentary voice acquired by the voice acquiring unit 503 and the video sequence number; and a sequence number sending unit 505, configured to send to a video playback end the correspondence between the voice sequence number and the video sequence number, so that the video playback end plays the commentary voice according to the correspondence between the voice sequence number and the video sequence number while playing a video.

The video sequence number is a sequence number for representing a video slice. An order of video slices may be determined according to the video sequence number, for example, a video frame. A frame number of the video frame may be used as the video sequence number.

Because this embodiment is implemented in a commentary end, it is required to play the video data for a commentator. The commentator may comment on the watched video image, thereby forming a commentary voice. The commentary voice is acquired by a commentary terminal of the commentary end. The voice sequence number is a sequence number for representing a voice slice. An order of voice slices may be determined according to the voice sequence number, for example, a voice frame. A frame number of the voice frame may be used as the voice sequence number.

In this embodiment of the present invention, because a video commentary end performs operations related to the video sequence number and the voice sequence number, so that the video playback end receives the correspondence between the voice sequence number and the video sequence number. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

This embodiment of the present invention further provides descriptions of an optional solution of a determining solution of a video sequence number by using an example, as follows: The video receiving unit 501, configured to receive the video data including a first correlation 2-tuple including a global base sequence number and the video sequence number, where a sequence number of a live voice in the video data is the global base sequence number and the video sequence number of the video data is determined according to the global base sequence number; and the sequence number determining unit 504, configured to determine a video sequence number of the to-be-commented video data according to the first correlation 2-tuple.

In this embodiment of the present invention, the sequence number as a basis is a sequence number obtained by segmenting a live voice, a sequence number obtained by segmenting video data may also be used as the basic sequence number, or a sequence number may be newly added as a basis, which is not limited by this embodiment of the present invention.

This embodiment of the present invention further provides descriptions of optional solutions of a determining solution of a voice sequence number and an expression form of a correspondence by using an example, as follows: Optionally, the sequence number determining unit 504, configured to determine a voice sequence number of the commentary voice according to the global base sequence number in the first correlation 2-tuple; and generate a second correlation 2-tuple including the global base sequence number and the voice sequence number.

Based on implementation solutions of the above embodiment, this embodiment of the present invention further provides a solution on sending a correspondence between the voice sequence number and the video sequence number, as follows: Optionally, the sequence number sending unit 505, configured to send the first correlation 2-tuple and the second correlation 2-tuple to a video playback end.

In this embodiment of the present invention, the first correlation 2-tuple and the second correlation 2-tuple may be combined into a triplet, which may include a global base sequence number, a video sequence number, and a voice sequence number. Therefore, the first correlation 2-tuple may include a global base sequence number, a video sequence number, and an unassignment sequence; and a newly-determined voice sequence number in the second correlation 2-tuple may be filled in the unassignment sequence in the triplet. Therefore, implementation of this embodiment of the present invention is not limited by the above embodiment. Any implementation solution that can be used to determine a correspondence between the voice sequence number and the video sequence number does not affect implementation of this embodiment of the present invention.

Figure 6:
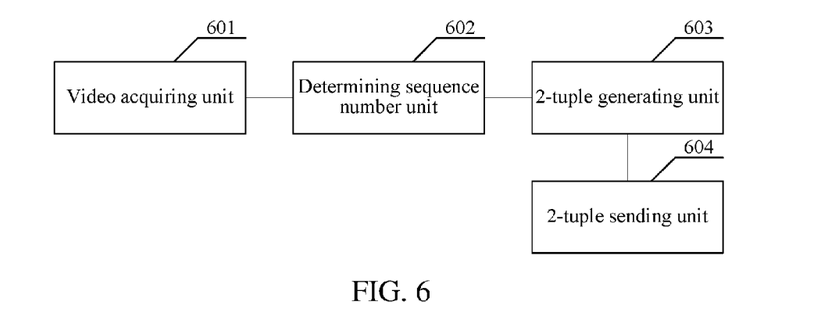
FIG. 6 is a schematic structural diagram of a terminal device according to an embodiment of the present invention.

An embodiment of the present invention further provides another terminal device as shown in FIG. 6, including:

a video acquiring unit 601, configured to acquire a live video as to-be-commented video data;

a sequence number determining unit 602, configured to extract a live voice from the video data, use a sequence number of the live voice as a global base sequence number, and determine a video sequence number of the video data according to the global base sequence number;

a 2-tuple generating unit 603, configured to generate a first correlation 2-tuple including the global base sequence number and the video sequence number; and a 2-tuple sending unit 604, configured to send to a video commentary end video data including the first correlation 2-tuple.

Based on descriptions of the above embodiment, in this embodiment of the present invention, the global base sequence number in the first correlation 2-tuple is used for generating the second correlation 2-tuple. However, the first correlation 2-tuple and the second correlation 2-tuple may be combined into a triplet, which may include a global base sequence number, a video sequence number, and a voice sequence number. Therefore, the first correlation 2-tuple, actually, may include a global base sequence number, a video sequence number, and an unassignment sequence; and a newly-determined voice sequence number in the second correlation 2-tuple may be filled in the unassignment sequence in the triplet. Therefore, if the solution is used, there is one unassignment sequence in a triplet. Actually, it may be thought that this triplet is equivalent to a 2-tuple. The difference between them lies in that a commentary end assigns a value to an unassignment sequence, or a sequence is newly added for assignment. Therefore, implementation of this embodiment of the present invention is not limited by the above embodiment. Any implementation solution that can be used to determine a correspondence between the sequence number of the live voice and the video sequence number does not affect implementation of this embodiment of the present invention.

This embodiment of the present invention is implemented by using the video acquiring end. By using correlation 2-tuples, an order of the video data and a playback order and a correspondence of a video and a voice are identified, so that it is convenient for the video commentary end to mark an order of a commentary voice and a correspondence between the commentary voice and the video according to the orders. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

This embodiment of the present invention further provides a solution on obtaining a global base sequence number, which is specifically as follows: Optionally, the sequence number determining unit 602, configured to segment the extracted a live voice into a data slice, so as obtain a sequence number of the live voice as a global base sequence number.

In this embodiment of the present invention, the sequence number as a base is a sequence number obtained by segmenting a live voice, a sequence number obtained by segmenting video data may also be used as the basic sequence number, or a sequence number may be newly added as a base, which is not limited by this embodiment of the present invention.

Figure 7:
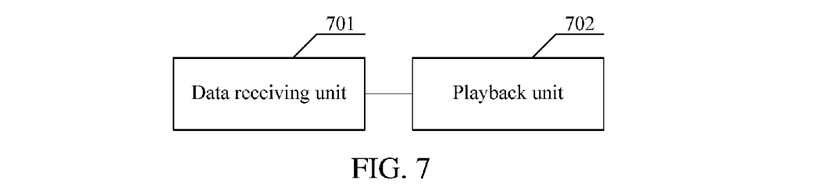
FIG. 7 is a schematic structural diagram of a terminal device according to an embodiment of the present invention.

An embodiment of the present invention further provides another terminal device as shown in FIG. 7, including:

a data receiving unit 701, configured to receive video data and a commentary voice that corresponds to the video data, the video data having a video sequence number and the commentary voice having a voice sequence number; and receive a correspondence between the voice sequence number and the video sequence number; and a playback unit 702, configured to play the commentary voice according to the correspondence between the voice sequence number and the video sequence number when the video data is played.

In this embodiment of the present invention, the video data may be from a commentary terminal of a commentary end, and may also be from a video acquiring end in which the video data is forwarded via a server, which is not limited by this embodiment of the present invention.

In this embodiment of the present invention, the correspondence between the voice sequence number and the video sequence number may be directly sent to a video playback device of a video playback end by the commentary terminal of the commentary end, and may also be forwarded and uniformly sent by the server, which is not limited by this embodiment of the present invention.

In this embodiment of the present invention, because the video playback end receives the correspondence between the voice sequence number and the video sequence number, regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators. This solution is applicable to a live transmission commentary as well as a recording commentary.

Figure 8:
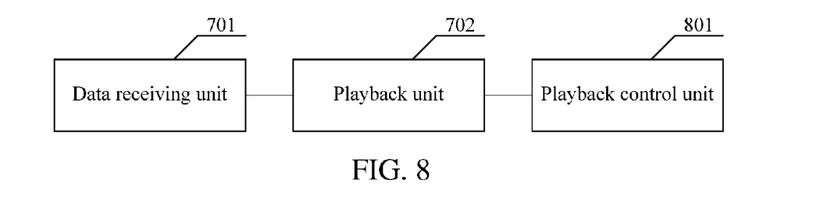
FIG. 8 is a schematic structural diagram of a terminal device according to an embodiment of the present invention.

This embodiment of the present invention further provides a processing solution when there are multiple commentary voices, which is specifically as follows: Further, as shown in FIG. 8, the terminal device further includes:

a playback control unit 801, configured to: if there are two or more a commentary voice sources and according to a preset rule, select or switch the currently played a commentary voice.

When there are multiple commentary voices, how to predefine a selection and switching rule may be set by a technical person freely, for example, a priority of each commentary end is set in advance, and a voice is selected to be played currently according to the priority. A specific rule is not limited by this embodiment of the present invention.

This embodiment of the present invention further provides a specific determining solution to a correspondence between the voice sequence number and the video sequence number, as follows: The data receiving unit 701, configured to receive a first correlation 2-tuple and a second correlation 2-tuple, where the first correlation 2-tuple includes a global base sequence number and the video sequence number and the second correlation 2-tuple includes the global base sequence number and the voice sequence number, where a sequence number of a live voice in the video data is the global base sequence number, the video sequence number of the video data is determined according to the global base sequence number, and the voice sequence number is determined according to the global base sequence number.

In this embodiment of the present invention, the sequence number as a base is a sequence number obtained by segmenting a live voice, a sequence number obtained by segmenting video data may also be used as the basic sequence number, or a sequence number may be newly added as a base, which is not limited by this embodiment of the present invention.

In this embodiment of the present invention, the first correlation 2-tuple and the second correlation 2-tuple may be combined into a triplet, which may include a global base sequence number, a video sequence number, and a voice sequence number. Therefore, the first correlation 2-tuple may include a global base sequence number, a video sequence number, and an unassignment sequence; and a newly-determined voice sequence number in the second correlation 2-tuple may be filled in the unassignment sequence in the triplet. Therefore, implementation of this embodiment of the present invention is not limited by the above embodiment. Any implementation solution that can be used to determine a correspondence between the voice sequence number and the video sequence number does not affect implementation of this embodiment of the present invention.

Based on the implementation solution in which two correlation 2-tuples are used, this embodiment of the present invention further provides a specific voice playback process, which is implemented as follows: Optionally, the playback unit 702, configured to acquire a sequence number of a current video image when the video data is played, acquire a global base sequence number corresponding to the sequence number of the current video image according to the first correlation 2-tuple, and acquire a voice sequence number corresponding to the acquired global base sequence number according to the second correlation 2-tuple; determine a live voice corresponding to the acquired global base sequence number and determine a commentary voice corresponding to the acquired voice sequence number; and play the determined a live voice and the determined a commentary voice when the current video image is played.

Figure 9:
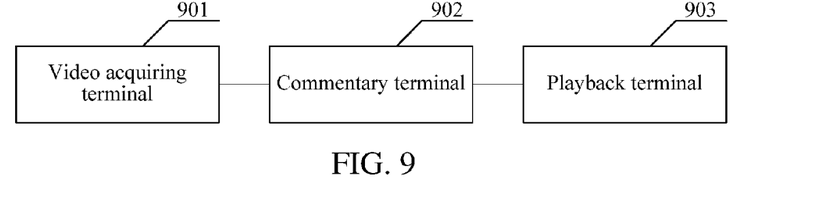
FIG. 9 is a schematic structural diagram of a system according to an embodiment of the present invention.

An embodiment of the present invention further provides a video remote-commentary synchronization system as shown in FIG. 9, including:

a video acquiring terminal 901, a commentary terminal 902, and a playback terminal 903 that are connected in a communicable manner, the video acquiring terminal 901 being any one of terminal devices for acquiring a video provided by embodiments of the present invention, the commentary terminal 902 being any one of terminal devices of a commentary end provided by embodiments of the present invention, and the playback terminal 903 being any one of terminal devices of a video playback end provided by embodiments of the present invention.

Because the video commentary end performs operations related to the video sequence number and the voice sequence number, so that the video playback end receives the correspondence between the voice sequence number and the video sequence number. Regardless of the number of the video commentary ends, the video commentary ends are independent of each other and do not interfere with each other, and moreover, the video playback end can determine when to play the commentary voice according to the correspondence between the voice sequence number and the video sequence number, so as to implement remote commentary synchronization of multiple commentators and a remote commentary on a same video by multiple commentators.

Figure 10:
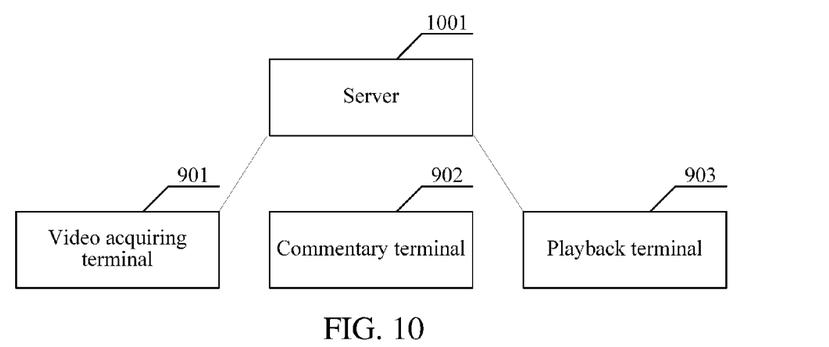
FIG. 10 is a schematic structural diagram of a system according to an embodiment of the present invention.

Further, the system as shown in FIG. 10, further includes a server 1001, where the server 1001 separately establishes a communicable connection with the video acquiring terminal 901, the commentary terminal 902, and the playback terminal 903, to forward data between the video acquiring terminal 901 and the commentary terminal 902, and data between the commentary terminal 902 and the playback terminal 903.

Optionally, there are two or more commentary terminals 902. It may be understood that, the number of the playback terminals 903 may be a random number greater and equal to 1.

Figure 11:
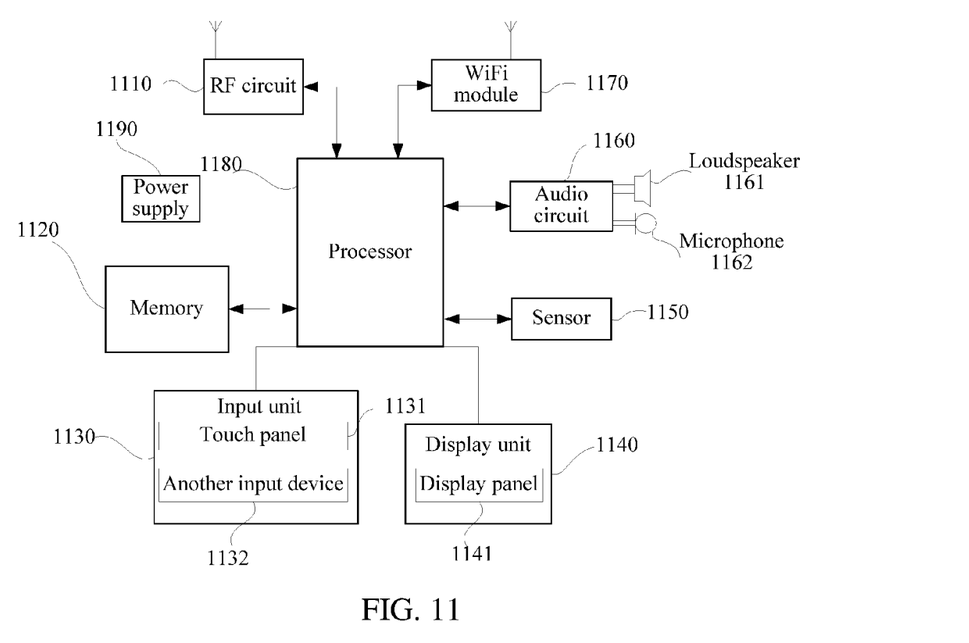
FIG. 11 is a schematic structural diagram of a terminal device according to an embodiment of the present invention.

An embodiment of the present invention further provides another terminal device. As shown in FIG. 11, for ease of description, only a part related to this embodiment of the present invention is shown. For specific technical details that are not disclosed, reference may be made to the embodiment method part of the present disclosure. The terminal may be any terminal device such as a mobile phone, a tablet computer, a Personal Digital Assistant (PDA), a Point of Sales (POS), a vehicle-mounted computer. For example, the terminal device is a mobile phone:

FIG. 11 is a block diagram of the structure of a part of a mobile phone related to a terminal according to an embodiment of the present invention. Referring to FIG. 11, the mobile phone includes components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that the structure of the mobile phone shown in FIG. 11 does not constitute a limitation to the mobile phone, and the mobile phone may include more components or fewer components than those shown in the figure, or some components may be combined, or a different component deployment may be used.

The following specifically describes the components of the mobile phone with reference to FIG. 11.

The RF circuit 1110 may be configured to receive and send signals during an information receiving and sending process or a call process. Particularly, the RF circuit 1110 receives downlink information from a base station, then delivers the downlink information to the processor 1180 for processing, and sends related uplink data to the base station. Generally, the RF circuit 1110 includes, but is not limited to, an antenna, at least one amplifier, a transceiver, a coupler, a low noise amplifier (LNA), and a duplexer. In addition, the RF circuit 1110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1120 may be configured to store a software program and module. The processor 1180 runs the software program and module stored in the memory 1120, to implement various functional applications and data processing of the mobile phone. The memory 1120 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1120 may include a high speed random access memory, and may also include a non-volatile memory such as at least one magnetic disk storage device, a flash memory, or another volatile solid-state storage device.

The input unit 1130 may be configured to receive input digit or character information, and generate a keyboard signal input related to the user setting and function control of the mobile phone. Specifically, the input unit 1130 may include a touch panel 1131 and another input device 1132. The touch panel 1131, which may also be referred to as a touch screen, may collect a touch operation of a user on or near the touch panel (such as an operation of a user on or near the touch panel 1131 by using any suitable object or accessory such as a finger or a stylus), and drive a corresponding connection apparatus according to a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1180. Moreover, the touch controller can receive and execute a command sent from the processor 1180. In addition, the touch panel 1131 may be a resistive, capacitive, infrared, or surface sound wave type touch panel. In addition to the touch panel 1131, the input unit 1130 may further include the another input device 1132. Specifically, the another input device 1132 may include, but is not limited to, one or more of a physical keyboard, a functional key (such as a volume control key or a switch key), a track ball, a mouse, and a joystick.

The display unit 1140 may be configured to display information input by the user or information provided for the user, and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1131 transfers the touch operation to the processor 1180, so as to determine the type of the touch event. Then, the processor 1180 provides a corresponding visual output on the display panel 1141 according to the type of the touch event. Although, in FIG. 11, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150 such as an optical sensor, a motion sensor, and other sensors. Specifically, the optical sensor may include an ambient light sensor and a proximity sensor. The ambient light sensor may adjust luminance of the display panel 1141 according to brightness of the ambient light. The proximity sensor may switch off the display panel 1141 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1160, a loudspeaker 1161, and a microphone 1162 may provide audio interfaces between the user and the mobile phone. The audio circuit 1160 may convert received audio data into an electric signal and transmit the electric signal to the loudspeaker 1161. The loudspeaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 1180 for processing. Then, the processor 1180 sends the audio data to, for example, another mobile phone by using the RF circuit 1110, or outputs the audio data to the memory 1120 for further processing.

The WiFi belongs to a short distance wireless transmission technology. The mobile phone may help, by using the WiFi module 1170, the user to receive and send e-mails, browse a webpage, access streaming media, and so on, which provides wireless broadband Internet access for the user. Although FIG. 11 shows the WiFi module 1170, it may be understood that the WiFi module is not a necessary component of the mobile phone, and when required, the WiFi module may be omitted as long as the scope of the essence of the present disclosure is not changed.

The processor 1180 is the control center of the mobile phone, and is connected to various parts of the mobile phone by using various interfaces and lines. By running or executing the software program and/or module stored in the memory 1120, and invoking data stored in the memory 1120, the processor 1180 performs various functions and data processing of the mobile phone, thereby performing overall monitoring on the mobile phone. Optionally, the processor 1180 may include one or more processing units. Preferably, the processor 1180 may integrate an application processor and a modem. The application processor mainly processes an operating system, a user interface, an application program, and the like. The modem mainly processes wireless communication. It may be understood that the foregoing modem may also not be integrated into the processor 1180.

The mobile phone further includes the power supply 1190 (such as a battery) for supplying power to the components. Preferably, the power supply may be logically connected to the processor 1180 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present invention, the processor 1180 included in the terminal further controls to perform steps that are related to the playback terminal, or the commentary terminal or the video acquiring terminal and in the method embodiments.

It should be noted that, in the foregoing embodiment of the terminal device, all units included in the terminal device are merely divided according to functional logic, and the unit division is not limited to the foregoing division as long as a corresponding function can be implemented. In addition, specific names of functional units are also merely for distinguishing from each other, but are not intended to limit the protection scope of the present disclosure.

In addition, a person of ordinary skill in the art may understand that all or some of the steps of the foregoing method embodiments may be implemented by a program instructing relevant hardware. The corresponding program may be stored in a computer readable storage medium. The storage medium mentioned above may be a read-only memory, a magnetic disk, or an optical disc, or the like.

The foregoing descriptions are merely specific implementation manners of the present disclosure, but are not intended to limit the protection scope of the present disclosure. Any variation or replacement readily figured out by a person skilled in the art within the technical scope disclosed in the embodiments of the present invention shall fall within the protection scope of the present disclosure. Therefore, the protection scope of the present disclosure shall be subject to the protection scope of the claims.

What is claimed is:

1. A video remote-commentary synchronization method, comprising:
receiving to-be-commented video data, and determining a video sequence number of the to-be-commented video data;
playing the to-be-commented video data, acquiring a commentary voice, and determining a correspondence between a voice sequence number of the commentary voice and the video sequence number; and
sending, to a video playback end, the correspondence between the voice sequence number and the video sequence number, so that the video playback end plays the commentary voice according to the correspondence between the voice sequence number and the video sequence number while playing a video;
wherein the receiving to-be-commented video data, and determining a video sequence number of the to-be-commented video data comprises:
comprising, by the video data, a first correlation 2-tuple of a global base sequence number and the video sequence number, wherein a sequence number of a live voice in the video data is the global base sequence number, and the video sequence number of the video data is determined according to the global base sequence number; and
determining a video sequence number of the to-be-commented video data according to the first correlation 2-tuple.

2. The method according to claim 1, wherein the determining a correspondence between a voice sequence number of the commentary voice and the video sequence number comprises:
determining a voice sequence number of a commentary voice according to the global base sequence number in the first correlation 2-tuple; and generating a second correlation 2-tuple comprising the global base sequence number and the voice sequence number.

3. The method according to claim 2, wherein the sending to a video playback end the correspondence between the voice sequence number and the video sequence number comprises:
sending the first correlation 2-tuple and the second correlation 2-tuple to a video playback end.

4. A video remote-commentary synchronization method, comprising:
acquiring a live video as to-be-commented video data;
extracting a live voice from the video data, using a sequence number of the live voice as a global base sequence number, and determining a video sequence number of the video data according to the global base sequence number; and
generating a first correlation 2-tuple comprising the global base sequence number and the video sequence number, and sending to a video commentary end video data comprising the first correlation 2-tuple.

5. The method according to claim 4, wherein the using a sequence number of the live voice as a global base sequence number comprises:
segmenting the extracted a live voice into a data slice, so as obtain a sequence number of the live voice as a global base sequence number.

6. A video remote-commentary synchronization method, comprising:
receiving video data and a commentary voice that corresponds to the video data, the video data having a video sequence number and the commentary voice having a voice sequence number;
receiving a correspondence between the voice sequence number and the video sequence number; and
playing the commentary voice according to the correspondence between the voice sequence number and the video sequence number when the video data is played,
wherein there are two or more a commentary voice sources, and the method further comprises:
selecting or switching the currently played a commentary voice according to a preset rule; and
the receiving a correspondence between the voice sequence number and the video sequence number comprises:
receiving a first correlation 2-tuple and a second correlation 2-tuple, wherein the first correlation 2-tuple comprises a global base sequence number and the video sequence number and the second correlation 2-tuple comprises the global base sequence number and the voice sequence number, wherein a sequence number of a live voice in the video data is the global base sequence number, the video sequence number of the video data is determined according to the global base sequence number, and the voice sequence number is determined according to the global base sequence number.

7. The method according to claim 6, wherein the playing the commentary voice according to the correspondence between the voice sequence number and the video sequence number when the video data is played comprises:

acquiring a sequence number of a current video image when the video data is played, acquiring a global base sequence number corresponding to the sequence number of the current video image according to the first correlation 2-tuple, and acquiring a voice sequence number corresponding to the acquired global base sequence number according to the second correlation 2-tuple;

determining a live voice corresponding to the acquired global base sequence number and determining a commentary voice corresponding to the acquired voice sequence number; and playing the determined a live voice and the determined a commentary voice when the current video image is played.

\* \* \* \* \*